United States Patent Office 3,449,063
Patented June 10, 1969

3,449,063
METHOD OF CONTROLLING EXHAUST EMISSION
Margaret E. Griffing, Southfield, Frances W. Lamb, Orchard Lake, and Ruth E. Stephens, Detroit, Mich., assignors to Ethyl Corporation, New York, N.Y., a corporation of Virginia
No Drawing. Filed May 13, 1966, Ser. No. 549,789
Int. Cl. B01j *11/22;* B01d *53/34*
U.S. Cl. 23—2        10 Claims

ABSTRACT OF THE DISCLOSURE

Reduce the unburned hydrocarbons, carbon monoxide and oxides of nitrogen content of the exhaust gas of an internal combustion engine by contacting the exhaust gas together with oxygen and ammonia with a supported copper oxide or copper oxide-palladium catalyst.

---

This invention relates to a method of reducing the unburned hydrocarbon, carbon monoxide and oxides of nitrogen content of the exhaust gas of internal combustion engines. In particular, this invention relates to a method of reducing the noxious components of exhaust gas by contacting the exhaust gas together with oxygen, ammonia and a copper-containing catalyst.

The exhaust gas of internal combustion engines contains unburned hydrocarbons, carbon monoxide, nitrogen oxides and oxygen, among other materials. Investigators have reported that nitrogen oxides, in the presence of sunlight, lead to ozone formation and that ozone reacts with olefinic hydrocarbons in the atmosphere to form materials capable of causing eye irritation and, in some areas, photochemical smog. Therefore, efforts have been made to convert the exhaust gas from internal combustion engines to a less noxious form.

The purification of exhaust gas of internal combustion engines presents an extremely difficult problem because it contains unburned hydrocarbons, carbon monoxide and oxides of nitrogen. Ideally, these can be rendered harmless by oxidizing the unburned hydrocarbon and carbon monoxide to carbon dioxide and water and reducing the nitrogen oxide to elemental nitrogen. However, catalysts capable of causing the reduction of nitrogen oxides with hydrocarbons also catalyze the reaction of hydrocarbons with oxygen, liberating large amounts of heat, which has, in the past, resulted in deactivation of the catalyst. Furthermore, catalysts capable of causing the oxidation of hydrocarbons and carbon monoxide frequently will concurrently catalyze the oxidation of chemicals which might otherwise reduce the nitrogen oxide content of exhaust gas. It has now been discovered that certain copper catalysts will selectively decrease the content of nitrogen oxides by ammonia in the presence of unburned hydrocarbons, carbon monoxide and oxygen while concurrently catalyzing the oxidation of unburned hydrocarbons and carbon monoxide to non-noxious materials.

An object of this invention is to remove objectionable constituents of the exhaust gas of internal combustion engines. A further object is to provide a method of decreasing the oxides of nitrogen content of exhaust gas. A still further object is to provide a method of decreasing the nitrogen oxides in exhaust gas while concurrently oxidizing the unburned hydrocarbon and carbon monoxide constituents to less noxious products. Another object is to furnish selective catalysts capable of concurrently decreasing the content of oxides of nitrogen by ammonia and catalyzing the air oxidation of unburned hyrocarbons and carbon monoxide to less noxious products.

These and other objects are accomplished by providing a method of treating the exhaust gas of internal combustion engines whereby the exhaust gas together with oxygen is mixed with ammonia and the resulting mixture contacted with a selective catalyst comprising a support material impregnated with a catalytic amount of copper in an oxide form.

In a preferred embodiment the selective catalyst comprises an alumina impregnated with from about 0.001 to 25 weight percent copper in an oxide form.

Highly preferred catalysts are those in which the support material is impregnated with copper oxide. These catalysts are extremely efficient in decreasing the content of nitrogen oxides with ammonia over a wide temperature range. However, it is frequently desirable to include a small amount of a promoter metal together with the copper oxide. This is done in order to obtain greater efficiency for the oxidation of the unburned hydrocarbons and carbon monoxide. For example, a supported copper oxide catalyst promoted with a small amount of palladium is a highly effective catalyst for the oxidation of unburned hydrocarbons and carbon monoxide and is still capable of decreasing to a high degree the amount of nitrogen oxides with ammonia. This is highly unexpected because a supported palladium catalyst without copper oxide has been found to increase the amount of nitrogen oxides in an exhaust gas mixed with oxygen and ammonia by as much as 65 percent. Thus, another preferred embodiment of this invention is a method of decreasing the unburned hydrocarbon, carbon monoxide and oxides of nitrogen content of exhaust gas of internal combustion engines by contacting said exhaust gas together with oxygen and ammonia with a selective catalyst consisting of a support material impregnated with from about 0.001 to 25 weight percent copper in an oxide form and from about 0.001 to 3 weight percent palladium.

Suitable supports for the selective catalysts employed include catalytic support materials which can function at the temperatures encountered in exhaust gas. Some examples of such materials are alumina, silica, silica alumina, zirconia, thoria, aluminum silicates, magnesia, silicon carbide, mullite, and the like. Of these, the more preferred support material is an alumina, and the most preferred support material is a silica alumina containing the equivalent of from 0.001 to about 10 weight percent silica. These materials are commercially available or can be prepared by gelling an alumina silica sol by adding a base, and then drying and calcining the silica alumina gel. Another method is to gel an alumina sol and mix the alumina gel with a silica-containing material such as kaolin. The resulting plastic material can be extruded, dried and calcined, resulting in a silica alumina support that is very resistant to powdering when exposed to the severe environmental conditions encountered in an exhaust gas system.

The catalyst can be prepared by immersing the support material in a solution of a copper salt decomposable to the oxide form. Examples of such salts include copper nitrate, copper acetate, copper ammonium carbonate (made from copper carbonate and aqueous ammonia solution), copper ammonium chloride, and the like. When a palladium promoted copper oxide catalyst is desired, a soluble palladium compound such as palladium chloride hydrate or palladium nitrate can be included in the copper impregnating solution, or the catalyst may be prepared in steps by first impregnating the support with the copper salt, and thermally decomposing this to an oxide form, and, secondly, impregnating the carrier with a solution of a palladium compound followed by a second calcination.

The following non-limiting examples serve to illustrate some methods of preparing catalysts useful in the present invention. All parts are parts by weight unless otherwise specified.

EXAMPLE 1

A solution comprising 5 parts of ammonium carbonate and 18 parts of aqueous ammonium hydroxide (28 percent ammonia) is prepared. Eleven parts of basic copper carbonate are dissolved in the solution. A deeply violet-colored solution of copper ammonium carbonate results. The volume of the solution is adjusted with water until it is sufficient to immerse 100 parts of an activated alumina containing about 0.01 percent silica. After allowing about one hour of immersion, the excess liquid is drained off and the impregnated alumina is gradually dried at a temperature of about 100° C. Following this, the impregnated alumina is heated to about 350° C., thereby driving off carbon dioxide, ammonia and water. The resulting catalyst contains about 10 percent copper in an oxide form impregnated on an activated silica alumina.

EXAMPLE 2

The procedure of Example 1 is followed, but the amount of basic copper carbonate, ammonium hydroxide and ammonium carbonate is adjusted so that the finished catalyst contains about 25 percent copper in an oxide form.

EXAMPLE 3

The procedure of Example 1 is followed, but the amounts of basic copper carbonate, ammonium hydroxide and ammonium carbonate are adjusted so that the finished catalyst contains about 0.01 weight percent copper in an oxide form.

Other support materials may be employed in the foregoing examples such as silica, zirconia, thoria, aluminum silicate, magnesia, silicon carbide, mullite, or the like, resulting in a catalyst comprising a support material containing copper in an oxide form.

EXAMPLE 4

A 10 percent solution of copper nitrate is prepared. This solution is added to 100 parts of an activated silica alumina containing the equivalent of about 10 percent silica in the form of kaolin. Sufficient cupric nitrate solution is used to completely immerse the silica alumina support. After standing for an hour, the excess solution is drained and the impregnated support is dried at a temperature of about 100° C. in an air circulating oven. After the bulk of the water has evaporated the catalyst is placed in a calcining oven and heated to 800° C. over a 4-hour period. It is then allowed to cool, resulting in a silica alumina supported copper oxide catalyst containing about 6 weight percent of copper as an oxide of copper.

Different concentrations of cupric nitrate solution can be employed in the above example, from about one weight percent to about 50 weight percent, resulting in catalysts containing varying amounts of copper, from about 0.01 to about 25 weight percent.

EXAMPLE 5

At room temperature, 740 parts of basic cupric carbonate were dissolved in an aqueous solution containing 300 parts of ammonium carbonate and 325 parts of ammonia. To this was added 20 parts of palladium nitrate. Following this, 8,450 parts of a silica alumina obtained from the Kaiser Aluminum Company, identified as KA–101, were immersed in the solution for about one hour. The temperature of the mixture was then gradually raised to drive off all free water. Following this, the catalyst was slowly heated in a calcining oven to a temperature of 650° C. and maintained at this temperature for one-half hour. The catalyst was then allowed to cool, resulting in an alumina support impregnated with about 5 weight percent copper in an oxide form and about 0.1 weight percent palladium.

EXAMPLE 6

An aqueous solution was prepared containing 121 parts of cupric nitrate, 0.15 part of palladium as palladium nitrate, and 21 parts of phosphoric acid and 4 parts of hydrogen bromide. Following this, 650 parts of the KA–101 alumina described in the previous example was immersed in the solution. After standing for about one-half hour the mixture was heated to drive off excess water, following which the catalyst composite was heated to about 600° C., and maintained at this temperature for 45 minutes. The catalyst was allowed to cool, resulting in an alumina supported catalyst impregnated with about 4.6 percent copper in an oxide form and 0.02 weight percent palladium.

EXAMPLE 7

An aqueous solution is prepared containing 45 parts of copper as cupric acetate. Six hundred parts of magnesia is immersed in this solution and allowed to stand until thoroughly impregnated. The mixture is then heated to dryness and the resulting catalyst composite is slowly heated to 500° C. Following this, the catalyst is cooled and then immersed in an aqueous solution containing 20 parts of palladium as palladium chloride. This mixture is heated to dryness and then subjected to a calcination at a temperature of 650° C. for one hour The finished catalyst comprises a major portion of magnesia impregnated with about 7 weight percent copper in an oxide form and about 3 weight percent palladium.

EXAMPLE 8

Aluminum silicate is used as the carrier in this example. Six hundred parts of this material are immersed in a solution containing 155 parts of copper as basic cupric carbonate, 160 parts of ammonium carbonate and 175 parts of ammonia. Two parts of palladium as palladium nitrate are dissolved in the solution. After allowing the impregnating mixture to stand for about an hour, the mixture is heated until dry and the resulting catalyst composite is then calcined at a temperature of about 750° C. for one hour. The finished catalyst contains a major portion of aluminum silicate containing about 23 percent copper as copper oxide and 0.3 percent palladium.

The quantities of copper compound and palladium compound employed in the foregoing examples can be readily varied so as to result in catalysts containing anywhere from 0.001 to about 25 weight percent copper and from 0.001 to 3 percent palladium.

Although some oxygen is normally present in the exhaust stream of an internal combustion engine, it is usually preferred to add additional air to assure effective oxidation of the unburned hydrocarbon and carbon monoxide in the exhaust gas. This can be accomplished by injecting supplemental air directly into the exhaust manifold or air can be injected subsequently in any point in the exhaust system prior to the catalyst bed. It is preferable to inject the air in the exhaust manifold.

In carrying out the process of this invention ammonia can be injected into the exhaust stream at any point prior to the catalyst bed. It can be added from a storage cylinder containing liquid ammonia under pressure or as an aqueous ammonia solution. The quantity of ammonia added to the exhaust stream depends to some extent upon the amount of nitrogen oxides in the exhaust gas. Good results are obtained when from about 0.1 to 10 theories of ammonia are employed. One theory of ammonia is defined as the ratio of four moles of ammonia for every three moles of nitrogen oxides in the exhaust gas. Excellent results are obtained when from 0.5 to one theory of ammonia is added to the exhaust stream, and a most preferred rate of adding ammonia to the exhaust gas is such a rate as to supply from 0.75 to one theory of ammonia based upon the amount of nitrogen oxide present in the exhaust gas. Based upon an average nitrogen oxide content of exhaust gas of from 1000 to 1500 parts per million (p.p.m.), satisfactory results are obtained when from 0.5 to 1.5 pounds of ammonia are injected into the exhaust stream per 100 pounds of fuel consumed in the operation of the internal combustion engine.

A highly preferred method of introducing ammonia into the exhaust gas stream is by means of a thermally decomposable ammonia generating compound. A most preferred compound of this type is ammonium carbonate. This compound decomposes at about 58° C., evolving ammonia, carbon dioxide and water, which are introduced into the exhaust stream before it enters the catalyst bed. Heat for decomposing the ammonium carbonate is readily supplied by the hot exhaust gas. The entire exhaust gas can be passed through a container filled with granules of ammonium carbonate or a small part of the exhaust stream may be by-passed from the main exhaust stream and through a parallel system passed through a container filled with ammonium carbonate and subsequently after thermally decomposing a portion of ammonium carbonate, return to the main exhaust stream. This method provides a means for controlling the rate at which ammonia is introduced into the exhaust stream. Another method is to place the ammonium carbonate in a container separate from the exhaust stream, but in intimate contact with it, and having a passage from the ammonium carbonate container to the exhaust gas stream. Following this process, heat is conducted to the ammonium carbonate from the exhaust gas through a heating exchanging process, through a wall separating the exhaust gas from the ammonium carbonate container. This heat thermally decomposes the ammonium carbonate and the ammonia containing decomposition products pass into the exhaust stream through the passage provided. A still further method of introducing ammonia into the exhaust stream when supplemental air injection is employed is to first pass the supplemental air through a heated container of lumps of ammonium carbonate, and then to inject this supplemental air into the exhaust system at a point prior to the catalyst bed, preferably in the exhaust manifold. Another method of heating the ammonium carbonate is by circulating the coolant in a liquid cooled engine so that it can transfer heat to the ammonium carbonate.

The exhaust gas containing unburned hydrocarbons, carbon monoxide, oxygen and ammonia is passed through a catalyst bed of the copper containing catalysts previously described. The catalytic bed is usually placed in a container which also functions as a muffler, frequently referred to as a catalytic muffler. Suitable catalyst containers are described in U.S. Patents 3,154,389; 3,149,926; 3,149,925 and 3,146,073, among others. In general, these devices comprise a container with means of retaining a catalyst material therein. The container has an exhaust inlet and outlet and provides means whereby the exhaust gas is uniformly contacted with the catalytic material.

The copper-containing catalysts are able to selectively decrease the amount of nitrogen oxides by ammonia and the oxidation of unburned hydrocarbons and carbon monoxide by oxygen over a wide temperature range. A catalyst made from an alumina impregnated with copper in an oxide form is especially active in reducing nitrogen oxides over a temperature range of from about 700 to 1200° F. Alumina supports impregnated with copper oxide and promoted with palladium effectively decrease nitrogen oxides in exhaust gas at temperatures as low as 500° F., although its activity is diminished above 800° F.

Tests have been carried out which demonstrate the unique ability of the catalysts of the present invention when operating in an exhaust gas containing unburned hydrocarbons, carbon monoxide, nitrogen oxides, oxygen and ammonia to selectively oxidize the unburned hydrocarbons and carbon monoxide while at the same time decreasing the content of the nitrogen oxides. In these tests, a single cylinder test engine (36 cubic inch displacement, overhead valve, 10:1 CR) was operated under the following conditions.

Air/fuel ratio _____ lb./lbs__ 15.0
Engine speed _____ r.p.m__ 1350
Ignition timing _____ ° B.T.C__ [1] 15
Supplemental air [2] _____ ft.³/hr__ 75

[1] Approximate value (adjusted to obtain about 1000 p.p.m. nitrogen oxides in the exhaust).
[2] Injected in the exhaust manifold.

The fuel used represented a typical commercial gasoline containing 3 ml. of tetraethyllead per gallon. The exhaust gas was passed through a 42 cubic inch catalytic bed. Means were provided to measure the unburned hydrocarbon, carbon monoxide and nitrogen oxide content of the exhaust gas, both before and after passing through the catalyst bed. The hydrocarbon and carbon monoxide content of the exhaust gas was measured using a Liston-Becker Model 15–A non-dispersive infrared spectrometer. The nitrogen oxides content was measured using a Lira mine safety appliance infrared detector. The Lira detector measures only nitric oxide. Chemical analysis of the exhaust stream, both before and after passing through the catalyst described herein, using the phenyl disulfonic acid method, which measures all oxides of nitrogen, has shown that this substantially agrees with the total oxides of nitrogen present in the exhaust gas of internal combustion engines, both before and after passing through the catalyst.

In the following test, the engine was operated as shown above. Aqueous ammonia (6–7 weight percent ammonia) was added to the exhaust stream prior to passing through the catalyst bed at a rate of about 4 ml. per minute. The catalyst consisted essentially of an activated alumina support containing 5 percent silica and impregnated with 5 percent copper in an oxide form. The exhaust stream from the engine contained 0.15 to 0.2 percent carbon monoxide, 137–145 p.p.m. hydrocarbons, and about 1100 p.p.m. of nitrogen oxides before passing through the catalyst. The following table records the percent reduction in carbon monoxide, hydrocarbon and nitrogen oxides obtained on contacting the exhaust gas together with oxygen and ammonia with the catalyst at various catalyst bed temperatures.

|  | Percent reduction | | | | | | |
| --- | --- | --- | --- | --- | --- | --- | --- |
|  | 680° F. | 770° F. | 840° F. | 890° F. | 950° F. | 1,000° F. | 1,100° F. |
| Carbon monoxide | 35 | 50 | 46 | 56 | 56 | 58 | 65 |
| Hydrocarbons | 30 | 35 | 38 | 65 | 73 | 76 | 83 |
| Nitrogen oxides | 36 | 45 | 55 | 54 | 50 | 50 | 40 |

As the above table shows, the copper oxide catalyst is effective in reducing the content of all three noxious components of exhaust gas, even in the presence of excess air, when the exhaust gas is contacted with the catalyst in the presence of ammonia. The performance of the catalyst varies with the temperature of the catalyst, and it can be seen that it is most effective in decreasing the content of nitrogen oxides in the range of from about 700–1200° F. Hence, an especially preferred embodiment of the invention is to contact exhaust gas together with oxygen and ammonia with a catalyst comprising a support material impregnated with about .001 to 25 weight percent copper in an oxide form at a temperature of from about 700–1200° F.

As previously stated, another embodiment of this invention is a support material impregnated with copper oxide and palladium. This catalyst is extremely effective in decreasing the content of nitrogen oxides, especially in the temperature range from about 600–800° F. The following table shows results obtained employing an activated alumina supported catalyst containing 6 percent silica, 6 percent copper in an oxide form and 0.1 percent palladium. The exhaust stream before passing through the catalyst bed contained about 1200 p.p.m. of nitrogen oxides. Aqueous ammonia (6–7 weight percent ammonia) was added to the exhaust stream at the rate of 4–5 ml. per minute.

| Catalyst temperature, °F.: | Percent NO reduction |
|---|---|
| 600 | 35 |
| 700 | 73 |
| 800 | 23 |

When the ammonia was added to the exhaust stream without the catalyst there was substantially no effect in decreasing the content of oxides of nitrogen, and when the catalyst was used without ammonia there was substantially no reduction in oxides of nitrogen.

In another test, run in a manner similar to before, the ammonia was introduced into the exhaust stream by first passing the supplemental air injected into the exhaust manifold through a container of ¼ inch lumps of ammonium carbonate. The supplemental air was gradually preheated before passing through the ammonium carbonate container and the following percent reduction in nitrogen oxides were obtained at different temperatures. The catalyst was an activated alumina containing 5 percent silica and impregnated with 5 percent copper in an oxide form. The catalyst bed was maintained at 840° F. throughout the test.

| Supplemental air temperature, °F.: | Percent reduction |
|---|---|
| 112 | 20 |
| 187 | 30 |
| 210 | 43 |
| 225 | 52 |
| 247 | 46 |
| 285 | 54 |
| 307 | 54 |
| 337 | 54 |

As the above results show, passing heated supplemental air over ammonium carbonate prior to injection into the exhaust manifold and then passing the exhaust gas through the catalyst is an effective embodiment of this invention. Heating the supplemental air improves the results. Similar improvements can be obtained by heating the ammonium carbonate directly and passing either the supplemental air or exhaust gas through it. The heat can be provided by a variety of means, but a preferred source is the heat in the exhaust gas itself.

Having fully described a method of concurrently decreasing the amount of the oxides of nitrogen, hydrocarbon and carbon monoxide content of exhaust gas, it is intended that this invention be limited only within the scope of the following claims.

We claim:
1. The method of reducing the unburned hydrocarbon, carbon monoxide and oxides of nitrogen content of the exhaust gas of an internal combustion engine, said method comprising contacting said exhaust gas containing unburned hydrocarbon, carbon monoxide and oxides of nitrogen together with oxygen, ammonia and a catalyst, said catalyst comprising a support material impregnated with from about 0.001 to 25 weight percent, based upon total catalyst weight, of copper in an oxide form.

2. The method of claim 1 wherein support material is an alumina.

3. The method of claim 1 wherein said exhaust gas, oxygen and ammonia are contacted with said catalyst at a temperature of from about 700 to about 1200° F.

4. The method of claim 1 wherein said ammonia is produced by thermal decomposition of an ammonia generating compound.

5. The method of claim 4 wherein said ammonia generating compound is ammonium carbonate.

6. The method of claim 5 wherein said ammonium carbonate is vaporized into said exhaust gas by the heat supplied by said exhaust gas.

7. The method of claim 1 wherein said catalyst is promoted with from about 0.001 to 3 weight percent of palladium.

8. The method of claim 7 wherein said exhaust gas together with oxygen and ammonia is contacted with said catalyst at a temperature of from about 600–800° F.

9. The method of claim 1 wherein additional oxygen above that normally present in said exhaust gas is supplied by injecting supplemental air into said exhaust gas prior to contacting said exhaust gas, said ammonia and said catalyst.

10. The method of claim 1 wherein said exhaust gas is produced from said internal combustion engine while operating at an air/fuel ratio of 15 on a weight basis.

References Cited

UNITED STATES PATENTS

| 2,910,343 | 10/1959 | Childers et al. | 23—2 |
| 2,924,504 | 2/1960 | Reitmeier | 23—2 |
| 3,008,796 | 11/1961 | Andersen et al. | 23—2 |
| 3,032,387 | 5/1962 | Andersen et al. | 23—2 |
| 3,228,746 | 1/1966 | Howk et al. | 23—2 |

OSCAR R. VERTIZ, *Primary Examiner.*

A. GREIF, *Assistant Examiner.*

U.S. Cl. X.R.

252—474